(12) United States Patent
You et al.

(10) Patent No.: US 7,645,541 B2
(45) Date of Patent: Jan. 12, 2010

(54) SECONDARY BATTERY OF EXCELLENT SEALABILITY

(75) Inventors: Seungjae You, Daejeon (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 795 days.

(21) Appl. No.: 11/337,383

(22) Filed: Jan. 23, 2006

(65) Prior Publication Data

US 2006/0216594 A1    Sep. 28, 2006

(30) Foreign Application Priority Data

Jan. 21, 2005    (KR) ...................... 10-2005-0005622

(51) Int. Cl.
*H01M 6/12*    (2006.01)
(52) U.S. Cl. ..................................... 429/162
(58) Field of Classification Search .................. 429/162
See application file for complete search history.

(56) References Cited

U.S. PATENT DOCUMENTS 6,267,790 B1 * 7/2001 Daroux et al. ............. 29/623.2

6,967,066 B2 * 11/2005 Kameyama et al. ......... 429/162

* cited by examiner

*Primary Examiner*—Patrick Ryan
*Assistant Examiner*—Thomas H. Parsons
(74) *Attorney, Agent, or Firm*—Cantor Colburn LLP

(57) ABSTRACT

Disclosed herein is a secondary battery comprising electrode leads mounted in a sealed fashion in a battery case while the electrode leads partially protrude from the battery case and resin films disposed between the battery case and the electrode leads wherein the electrode leads are provided at predetermined areas of the surfaces thereof, to which the resin films are applied, with irregular parts, by which the adhesive strength between the electrode leads and the resin films is increased. The adhesive strength between the electrode leads and the resin films is large, and the movement path of moisture or electrolyte, through which the moisture contained in the air or the electrolyte contained in the secondary battery may move, is extended. Consequently, the present invention has the effect of minimizing the reduction in service life of the secondary battery due to introduction of the moisture into the secondary battery and leakage of the electrolyte from the secondary battery. The secondary battery is very useful as a unit cell for medium- or large-sized battery systems, such as hybrid electric vehicles.

10 Claims, 4 Drawing Sheets

PRIOR ART

SECONDARY BATTERY OF EXCELLENT SEALABILITY

FIELD OF THE INVENTION

The present invention relates to a secondary battery with excellent sealability, more particularly, to a high-output, large-capacity secondary battery having minute irregular parts formed at predetermined areas of the surfaces of electrode leads, to which resin films are applied, such that the adhesive strength between the electrode leads and the resin films, which are disposed between the electrode leads and a battery case, is improved, whereby introduction of moisture contained in the air into the secondary battery and leakage of an electrolyte from the secondary battery are effectively prevented, and therefore, the service life of the secondary battery is increased.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Medium- or large-sized devices, such as vehicles, use a medium- or large-sized battery system having a plurality of cells electrically connected with each other because high output and large capacity is necessary for the medium- or large-sized devices. Pouch-shaped lithium-ion polymer batteries, which are widely used as unit cells of the medium- or large-sized battery system, have a size greater than that of interrelated batteries used in small-sized devices.

FIG. 1 is a typical view illustrating a method of manufacturing an exemplary pouch-shaped lithium-ion polymer secondary battery (hereinafter, sometimes referred to as a "large-capacity polymer battery"), which is used in a high-output, large-capacity battery system.

Referring to FIG. 1, the large-capacity polymer battery 100 is manufactured by mounting an electrode assembly 300, which comprises cathodes, separation films, and anodes, in a pouch-shaped battery case 200, which is made of a high polymer resin and aluminum laminate sheet, and coupling electrode leads 410 and 420 to the battery case 200 while the electrode leads 410 and 420 protrude outward from the upper end of the battery case 200. From the electrode assembly 300 extends electrode taps 310 and 320, which are coupled to the electrode leads 410 and 420, respectively. At the coupling area between the battery case 200 and the electrode leads 410 and 420 are disposed thin resin films 500, which prevent leakage of an electrolyte from the battery and prevent moisture contained in the air from being introduced into the battery while accomplishing electrical insulation of the electrical leads 410 and 420.

FIG. 2 is a partially enlarged view illustrating the coupling between the electrode leads and the battery case of the large-capacity polymer battery shown in FIG. 1.

Referring to FIG. 2, the cathode lead 410 and the anode lead 420, which are electrically connected to electrode assembly (not shown), which comprises the cathodes, the separation films, and the anodes, are mounted in a sealed fashion in the pouch-shaped case 200, which is made of the aluminum laminate sheet, while the cathode lead 410 and the anode lead 420 protrude outward from the upper end of the battery case 200. The resin films 500 are disposed between the battery case 200 and the electrode leads 410 and 420.

When the battery is manufactured, an upper end member 210 and a lower end member 220 of the battery case 200 are welded to each other at high temperature and high pressure. However, moisture contained in the air may be introduced into the battery case or the electrolyte may leak from the battery case through the gaps between the electrode leads 410 and 420 and the resin films 500 of the manufactured battery. As a result, the service life of the battery is reduced with the passage of time.

When the upper end member 210 and the lower end member 220 of the battery case 200 are welded to each other at higher temperature and higher pressure in order to solve the above-mentioned problems, the resin films may be melted, and therefore, the outer surface of the battery is contaminated, or the thin resin films are damaged, which accelerates the reduction of the service life of the battery. Alternatively, the predetermined areas of the surfaces of the electrode leads, to which the resin films are applied, may be treated using chromate. However, this chromate treatment causes environmental pollution due to heavy metals, and therefore, it is not desirable.

Consequently, the necessity of providing a new technology to solve the above-mentioned problems is highly requested.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when minute irregular parts are formed on predetermined areas of the surfaces of the electrode leads, to which the resin films are applied, the adhesive strength between the resin films and the electrode leads is highly increased under the welding conditions of the battery case (temperature and pressure), and therefore, introduction of moisture contained in the air into the secondary battery and leakage of an electrolyte from the secondary battery are effectively prevented. The present invention has been completed based on the above-mentioned discovery.

In accordance with an aspect of the present invention, the above and other objects can be accomplished by the provision of a secondary battery comprising: electrode leads mounted in a sealed fashion in a battery case while the electrode leads partially protrude from the battery case; and resin films disposed between the battery case and the electrode leads, wherein the electrode leads are provided at predetermined areas of the surfaces thereof, to which the resin films are applied, with irregular parts, by which the adhesive strength between the electrode leads and the resin films is increased.

Preferably, the secondary battery according to the present invention is a unit cell for high-output, large-capacity battery systems. The secondary battery is not particularly restricted so long as the secondary battery has a structure in which the insulating resin films are disposed between the battery case and the electrode leads. Preferably, the battery case of the secondary battery is made of a laminate sheet including a resin layer and a metal layer. The typical example of the battery case may be a pouch-shaped case made of an aluminum laminate sheet.

An electrode assembly mounted in the battery case of the secondary battery according to the present invention may be constructed in any one of various structures, for example, a stacking type structure or a jell-roll (winding type) structure. Based on the structure of an electrode assembly or the composition of an electrolyte, a secondary battery is generally classified as a lithium-ion battery, a lithium-ion polymer battery, or a lithium polymer battery. Preferably, the lithium-ion polymer battery is used in the present invention because the manufacturing costs of the battery are low, the possibility of leakage of the electrolyte is low, and the assembly process of the battery is simple.

The lithium-ion polymer battery is manufactured by mounting an electrode assembly comprising cathodes, separation films, and anodes, which are impregnated with an electrolyte, in a pouch-shaped battery case, which is made of an aluminum laminate sheet, and applying high temperature and high pressure to the contact areas of the battery case such that the contact areas of the battery case are welded.

One end of each electrode lead is located in the battery case while electrode taps of the electrode assembly are attached to the end of each electrode, and the other end of each electrode lead protrudes outward from the battery case. One of the electrode leads, i.e., the cathode lead, is a metal piece generally made of aluminum, the other electrode lead, i.e., the anode lead, is a metal piece generally made of copper. The electrode taps are normally coupled to the electrode leads by spot welding. The thickness of the electrode leads is approximately 200 to 500 µm.

The resin sheets are disposed at the contact areas of the battery case and the electrode leads. The resin sheets are normally made of a high polymer resin, such as polypropylene (PP) or polyethylene (PE). The resin sheets have a thickness of 100 to 300 µm.

The present invention is characterized in that the electrode leads are provided at predetermined areas of the surfaces thereof, to which the resin films are applied, with minute irregular parts, by which the adhesive strength between the electrode leads and the resin films is increased when the battery case is welded.

The minute irregular parts provide the electrode leads with increased surface area, by which the adhesive strength between the electrode leads and the resin films is increased. Furthermore, even when moisture contained in the air is introduced into the battery case or the electrolyte leaks from the battery case through the coupled areas of the electrode leads and the resin films, the movement path of the moisture or the electrolyte is remarkably extended, and therefore, the movement of the moisture or the electrolyte is minimized.

The irregular parts may be formed by various methods. For example, the irregular parts may be formed either by mechanical surface treatment, such as rolling, sand blasting, SiC paper grinding, laser irradiation, or ultrasonic wave application, or by chemical surface treatment, such as partial corrosion by chemical matter.

Preferably, the rolling is carried out to form the irregular parts on the surfaces of the electrode leads according to a temper rolling process. The temper rolling process is a process that performs light cold rolling of approximately 0.3 to 3.0% to improve the mechanical properties of an annealed cold-rolled steel sheet and to control the surface state of the annealed cold-rolled steel sheet. The partial corrosion by chemical matter may be accomplished by applying phosphoric acid, hydrochloric acid, or nitric acid to the electrode leads, and, after time necessary to form desired minute irregular parts on the surfaces of the electrode leads elapses, washing the electrode leads with distilled water. In order to remove metallic oxide layers from the surfaces of metal foils (for example, aluminum foils), which are used as the electrode leads, before the resin films are attached to the electrode leads, nitric acid may be applied to the surfaces of the metal foils, according to one of the conventional arts. However, it has been proved that the irregular parts formed on the surfaces of the metal foils by the nitric acid application do not increase the adhesive strength between the metal foils and the electrode leads as effectively as the present invention.

As a result of experiments, the inventors of the present application have found that the adhesive strength between the metal foils and the electrode leads is greatly increased by carrying out not only the mechanical surface treatment, such as rolling, sand blasting, SiC paper grinding, laser irradiation, or ultrasonic wave application, but also the chemical surface treatment, such as partial corrosion by chemical matter. The reason why the adhesive strength between the metal foils and the electrode leads is increased by carrying out both the mechanical surface treatment and the chemical surface treatment is not clearly verified. However, it is supposed that grooves constituting the irregular parts are formed in various sizes by both the mechanical surface treatment and the chemical surface treatment, and whereby the adhesive strength between the metal foils and the electrode leads is increased.

The shape and the orientation of the irregular parts according to the present invention are not particularly restricted. Preferably, each of the irregular parts includes a plurality of grooves formed at an angle of 0° (horizontal) to 50° to the upper end surface of the battery case. The grooves increase the contact areas between the electrode leads and the resin films, and extend the movement path of moisture and electrolyte.

The irregular parts may be formed entirely or partially on the predetermined areas of the surfaces of the electrode leads, to which the resin films are applied. Preferably, the irregular parts are formed entirely on the predetermined areas of the surfaces of the electrode leads, to which the resin films are applied.

Preferably, each of the irregular parts is formed such that the size of the grooves (the depth of the grooves) constituting the corresponding irregular part is in a range of between 1 to 4% of the thickness of the electrode leads. When the size of the grooves is below 1%, the increase of the adhesive strength between the electrode leads and the resin film and the extension of the movement path of the moisture or the electrolyte are not sufficiently accomplished. When the size of the grooves is above 4%, on the other hand, the physical properties of the electrode leads are damaged. In the case that the thickness of the electrode leads is 250 to 450 µm, the size of the grooves is 3 to 10 µm. However, it is possible that other more minute grooves may be formed together with the above-specified grooves.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

Figure 1:
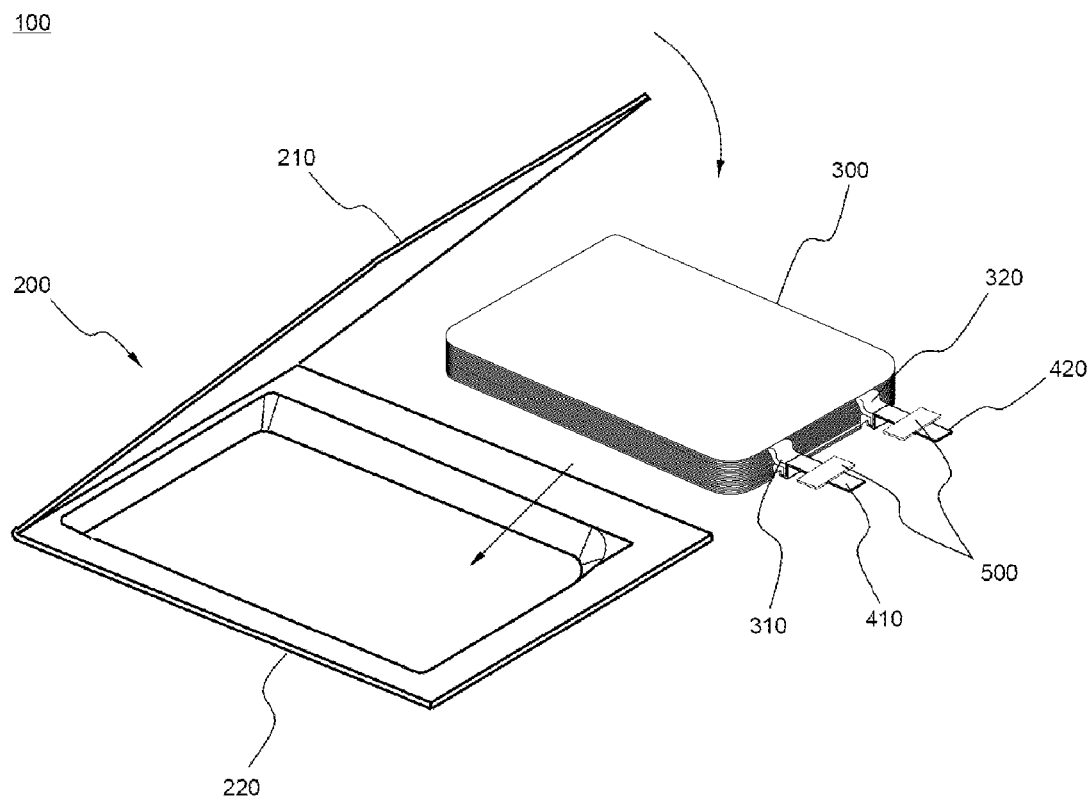
FIG. 1 is a typical view illustrating an exemplary pouch-shaped lithium-ion polymer secondary battery, which is used in a high-output, large-capacity battery system.
Figure 2:
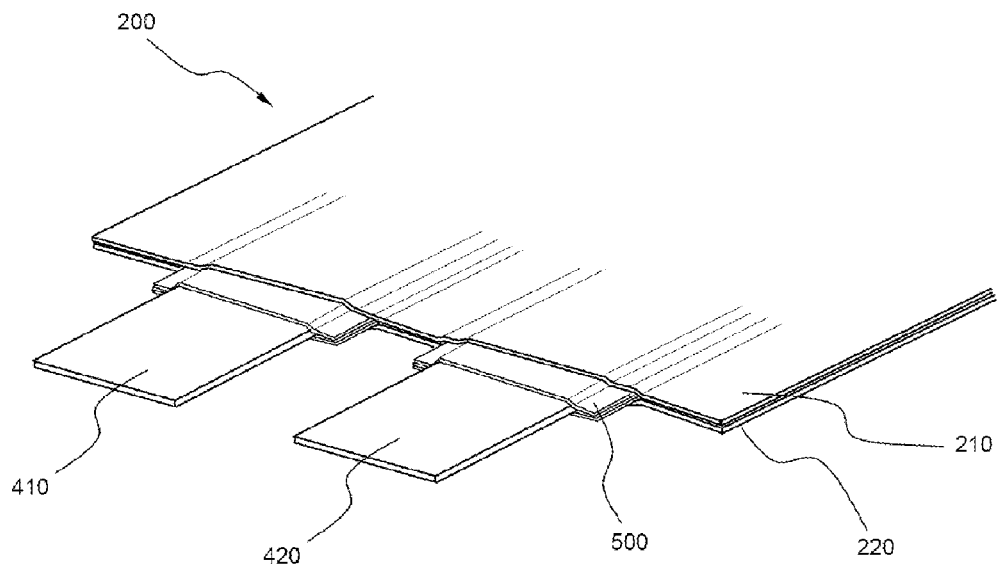
FIG. 2 is a partially enlarged view illustrating the coupling between the electrode leads and the battery case of the large-capacity polymer battery shown in FIG. 1.

100: pouch-shaped lithium-ion polymer battery
200: battery case
300: electrode assembly
410, 420: electrode leads
430: minute irregular part
500: resin films

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
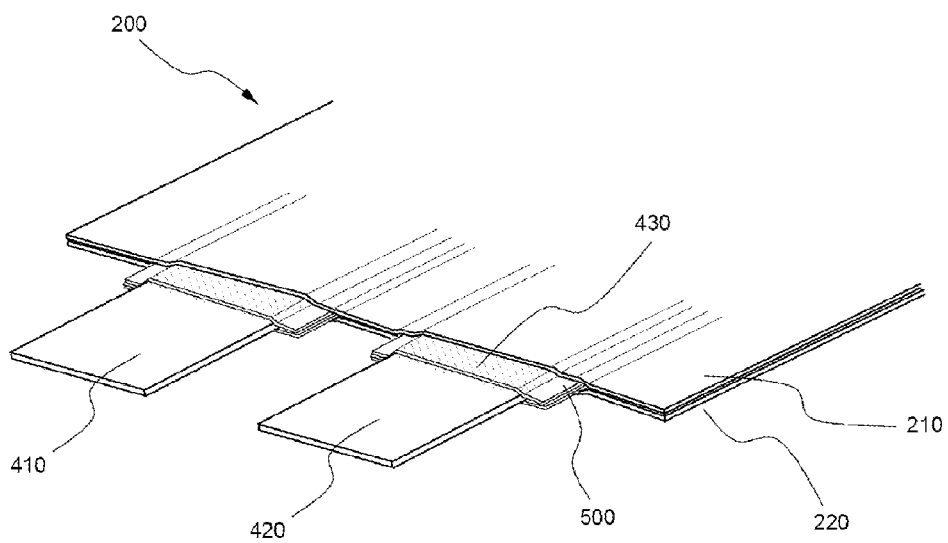
FIG. 3 is a partially enlarged view illustrating the coupling between electrode leads and a battery case of a pouch-shaped lithium-ion polymer secondary battery according to a preferred embodiment of the present invention.

FIG. 3 is a partially enlarged view illustrating the coupling between electrode leads and a battery case of a pouch-shaped lithium-ion polymer secondary battery according to a preferred embodiment of the present invention.

Referring to FIG. 3, a cathode lead 410 and an anode lead 420 are coupled to a battery case 200 while resin films 500 are disposed between the cathode lead 410 and the anode lead 420 and the battery case 200. The battery case 200 comprises an upper end member 210 and a lower end member 220, which are hingedly connected at the lower end of the battery case 200 as shown in FIG. 1. While the upper end member 210 and the lower end member 220 of the battery case 200 are in contact with each other, the contact areas of the upper end member 210 and the lower end member 220 are welded, and therefore, the upper end member 210 and the lower end member 220 securely coupled to each other. The resin films 500 are wrapped around the two electrode leads 410 and 420 while the upper ends of the resin films 500 protrude from the upper end of the battery case 200.

The electrode leads 410 and 420 are provided at predetermined areas of the surfaces thereof, to which the resin films 500 are applied, with minute irregular parts 430, by which the effects as previously described are accomplished.

Figure 4:
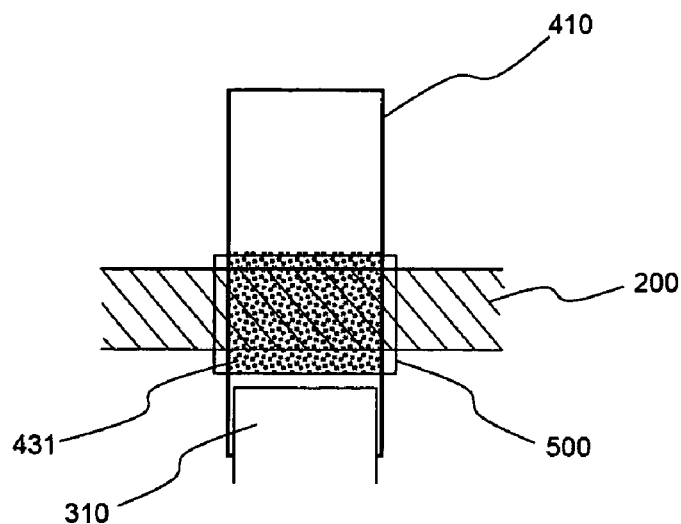
FIGS. 4 and 5 are typical see-through views illustrating electrode leads, each of which has a minute irregular part formed on the surface thereof, according to various preferred embodiments of the present invention.
Figure 5:
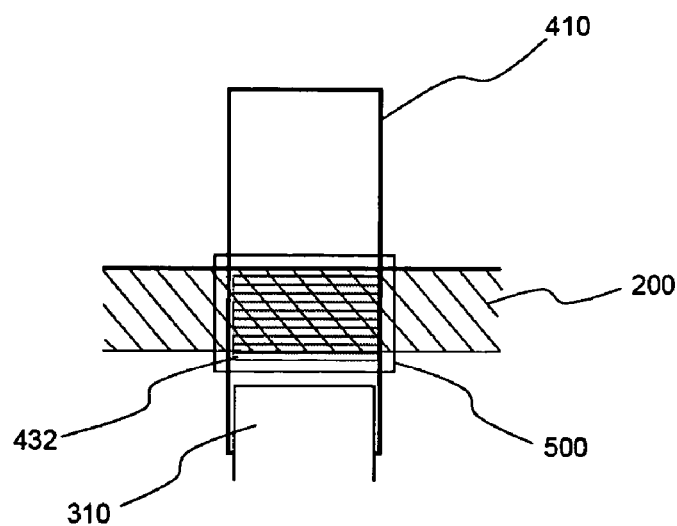

FIGS. 4 and 5 are typical see-through views illustrating electrode leads, each of which has a minute irregular part formed on the surface thereof, according to various preferred embodiments of the present invention.

Referring first to FIG. 4, a plurality of electrode taps 310 are coupled to the lower end of the electrode lead 410, which is a metal piece formed approximately in the shape of a rectangle, for example, by welding. To the middle of the electrode lead 410 is applied the resin film 500. The battery case 200 is welded to the resin film 500 while the resin film 500 is partially exposed to the outside. The electrode lead 410 is provided at the predetermined area of the surface thereof, to which the resin film 500 is applied, with a minute irregular part 431 having no orientation. By virtue of the minute irregular part 431, the contact area between the electrode lead 410 and the resin film 500 is increased, and therefore, the adhesive strength between the electrode lead 410 and the resin film 500 is increased. During the thermal welding of the battery case 200, some of the resin film 500 is introduced into a plurality of grooves constituting the minute irregular part 431. As a result, the adhesive strength between the electrode lead 410 and the resin film 500 is further increased.

Referring to FIG. 5, which is very similar to FIG. 4, the electrode lead 410 has a minute irregular part 432, which includes a plurality of grooves formed in parallel with the upper end of the battery case 200, formed thereon. That is to say, the grooves of the minute irregular part 432 have predetermined orientation. As a result, the surface area of the electrode lead 410 is increased with the result that the adhesive strength between the electrode lead 410 and the resin film 500 is increased. In addition, the movement path of moisture or electrolyte, through which the moisture contained in the air or the electrolyte contained in the battery may move, is extended, and therefore, the movement of the moisture or the electrolyte is minimized. In this embodiment, the size of the irregular part 432 is slightly less than the contact area between the electrode lead 410 and the resin film 500.

Now, the present invention will be described in more detail with reference to the following examples. It should be noted, however, that these examples are provided only for illustrating the present invention and should not be construed as limiting the scope and spirit of the present invention.

EXAMPLE 1

The surfaces of aluminum foil (foil for the cathode) and copper foil (foil for the anode), each of which has a size of 45 mm×30 mm and a thickness of approximately 350 μm, were rubbed by means of an SiC paper having a roughness of #800 grit at a rotating speed of 1000 to 1200 rpm for 3 minutes (SiC paper grinding). As a result of observation of the surfaces of the aluminum foil and the copper foil using a transmission electron microscope, it was confirmed that grooves having an average size of 4 to 5 μm were formed on the surfaces of the aluminum foil and the copper foil. The aluminum foil and the copper foil, the surfaces of which were treated as described above, were attached to the electrode taps of the electrode assembly by welding, and then resin films, which are made of polypropylene, were attached to the upper end surfaces and the lower end surfaces of the aluminum foil and the copper foil. Subsequently, the electrode assembly was mounted in the pouch-shaped battery case, which is made of an aluminum laminate sheet, carbonate-based lithium electrolyte containing 1M $LiPF_6$ was injected into the pouch-shaped battery case, and the sheet was thermally welded. In this way, a lithium-ion polymer battery was manufactured.

EXAMPLE 2

A lithium-ion polymer battery was manufactured in the same manner as Example 1, except that the surfaces of the aluminum foil and the copper foil were treated by sand blasting instead of the above-mentioned SiC paper grinding. It was confirmed that grooves having an average size of 5 to 6 μm were formed on the surfaces of the aluminum foil and the copper foil by the sand blasting.

EXAMPLE 3

A lithium-ion polymer battery was manufactured in the same manner as Example 1, except that the surfaces of the aluminum foil and the copper foil were treated by sand blasting, followed by phosphate treatment. It was confirmed that grooves having an average size of 5 to 6 μm were formed on the surfaces of the aluminum foil and the copper foil by the above-mentioned surface treatment.

COMPARATIVE EXAMPLE 1

A lithium-ion polymer battery was manufactured in the same manner as Example 1, except that the surfaces of the aluminum foil and the copper foil were not treated.

COMPARATIVE EXAMPLE 2

A lithium-ion polymer battery was manufactured in the same manner as Example 1, except that the surfaces of the aluminum foil and the copper foil were treated by DC etching using 1M hydrochloric acid to remove metallic oxide layers from the surfaces of the aluminum foil and the copper foil.

EXPERIMENTAL EXAMPLE 1

In order to measure the adhesive strength between the metal foils and the resin films during the manufacture of the secondary batteries according to Examples 1 to 3 and Comparative Examples 1 and 2, a 180-degree peeling test was carried out. The results of the test are shown in FIG. 6.

Figure 6:
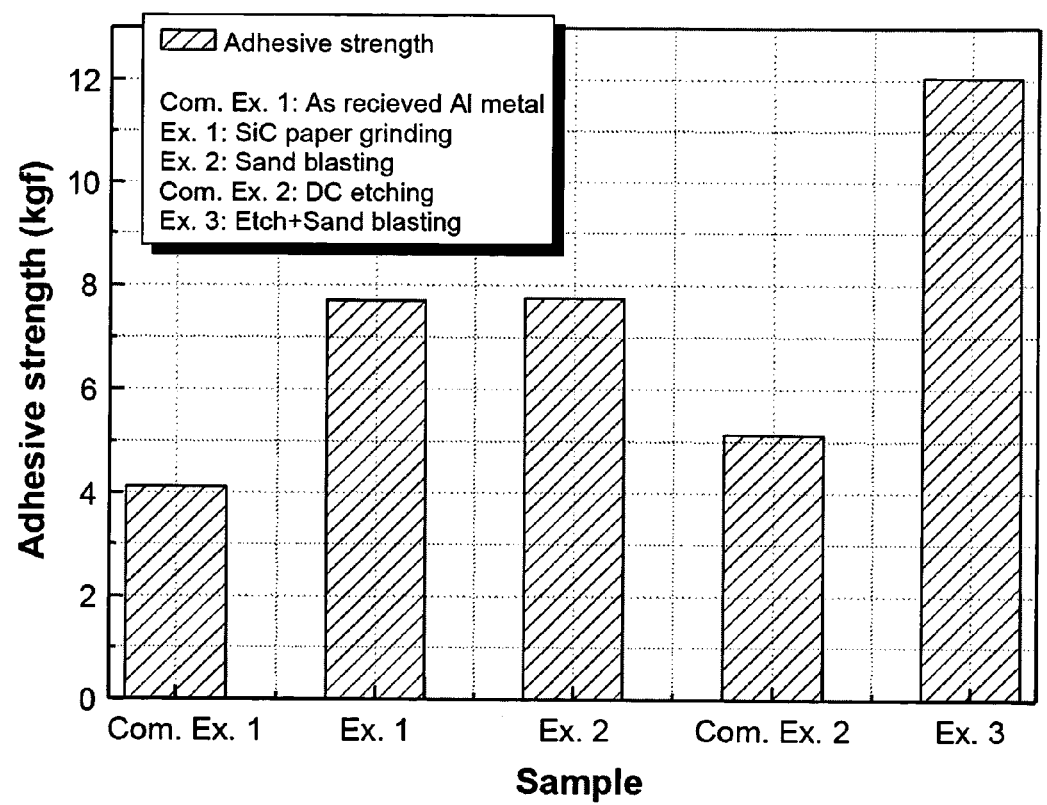
FIG. 6 is a graph illustrating the results of experiments carried out in Experimental Examples 1 and 2 of the present invention.

As shown in FIG. 6, it can be seen that the adhesive strengths of Examples 1 to 3 were higher than those of Comparative Example 1, in which the surface treatment was not carried out, and Comparative Example 2, in which the surfaces of the aluminum foil and the copper foil were treated using hydrochloric acid to remove only the metallic oxide layers from the surfaces of the aluminum foil and the copper foil. Especially, it can be seen that Example 3, in which both of the mechanical surface treatment and the chemical surface treatment are carried out, had higher adhesive strength.

EXPERIMENTAL EXAMPLE 2

The secondary batteries manufactured according to Examples 1 to 3 and Comparative Examples 1 and 2 were left under the high-temperature and high-humidity condition for approximately 4 weeks, and then the secondary batteries were disassembled. Subsequently, the concentration of HF among matters existing in the electrolyte was measured by a HF titration method using acid-base titration.

Generally, $LiPF_6$, which is contained in the electrolyte, reacts with water to generate HF, which is harmful to the battery. As a result, the performance and the service life of the battery are reduced. Consequently, it is possible to confirm the amount of moisture introduced into the battery case through the gaps between the electrode leads and the resin films by the measurement of the HF existing in the electrolyte.

The results of the measurement revealed that the amount of the HF generated in the batteries manufactured according to Examples 1 to 3 was remarkably less than that of the batteries manufactured according to Comparative Examples 1 and 2, and especially, the amount of the HF generated in the battery manufactured according to Example 3 was the least.

INDUSTRIAL APPLICABILITY

As apparent from the above description, the adhesive strength between the electrode leads and the resin films is high, and the movement path of moisture or electrolyte, through which the moisture contained in the air or the electrolyte contained in the secondary battery may move, is extended. Consequently, the present invention has the effect of minimizing the reduction in service life of the secondary battery due to introduction of the moisture into the secondary battery and leakage of the electrolyte from the secondary battery. This secondary battery according to the present invention is very useful as a unit cell for medium- or large-sized battery systems, such as hybrid electric vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising:
   electrode leads mounted in a sealed fashion in a battery case while the electrode leads partially protrude from the battery case; and
   resin films disposed between the battery case and the electrode leads,
   wherein the electrode leads are provided at predetermined areas of the surfaces thereof, to which the resin films are applied, with irregular parts, by which the adhesive strength between the electrode leads and the resin films is increased,
   wherein each of the irregular parts includes a plurality of grooves formed at an angle of 0° (horizontal) to 50° to the upper end surface of the battery case.

2. The secondary battery according to claim 1, wherein the battery is a unit cell for high-output, large-capacity battery systems.

3. The secondary battery according to claim 1, wherein the battery case is made of a laminate sheet including a resin layer and a metal layer.

4. The secondary battery according to claim 3, wherein the battery case is a pouch-shaped case made of an aluminum laminate sheet.

5. The secondary battery according to claim 1, wherein the battery is a pouch-shaped lithium-ion polymer battery.

6. The secondary battery according to claim 1, wherein the irregular parts are formed by both mechanical surface treatment and chemical surface treatment.

7. The secondary battery according to claim 6, wherein the mechanical surface treatment is conducted by rolling, sand blasting, SiC paper grinding, laser irradiation or ultrasonic wave application.

8. The secondary battery according to claim 7, wherein the rolling is carried out according to a temper rolling process.

9. The secondary battery according to claim 6, wherein the chemical surface treatment is conducted by partial corrosion by chemical matter.

10. The secondary battery according to claim 1, wherein each of the irregular parts is formed such that the size of grooves (the depth of grooves) constituting the corresponding irregular part is in a range of between 1 to 4% of the thickness of the electrode leads.

* * * * *